(12) United States Patent
Hofstaetter (10) Patent No.: US 9,567,513 B2
(45) Date of Patent: Feb. 14, 2017

(54) PERMEABLE FRACTURING MATERIAL

(75) Inventor: Herbert Hofstaetter, Voecklabruck (AT)

(73) Assignee: Montanuniversitaet Leoben, Leoben (AT)

( * ) Notice: Subject to any disclaimer, the term of this patent is extended or adjusted under 35 U.S.C. 154(b) by 0 days.

(21) Appl. No.: 13/814,907

(22) PCT Filed: Aug. 9, 2011

(86) PCT No.: PCT/EP2011/063723
§ 371 (c)(1),
(2), (4) Date: Apr. 30, 2013

(87) PCT Pub. No.: WO2012/020032
PCT Pub. Date: Feb. 16, 2012

(65) Prior Publication Data
US 2013/0206407 A1    Aug. 15, 2013

(30) Foreign Application Priority Data
Aug. 10, 2010  (EP) .................................. 10172442

(51) Int. Cl.
| | | |
|---|---|---|
| *C09K 8/035* | (2006.01) | |
| *C09K 8/68* | (2006.01) | |
| *C04B 26/02* | (2006.01) | |
| *C04B 28/02* | (2006.01) | |
| *C09K 8/62* | (2006.01) | |
| *E21B 43/267* | (2006.01) | |
| *C04B 111/00* | (2006.01) | |

(52) U.S. Cl.
CPC .................. *C09K 8/68* (2013.01); *C04B 26/02* (2013.01); *C04B 28/02* (2013.01); *C09K 8/62* (2013.01); *E21B 43/267* (2013.01); *C04B 2111/00284* (2013.01); *Y02W 30/97* (2015.05)

(58) Field of Classification Search
CPC ....... C09K 8/035; C09K 8/512; C10M 169/04
USPC ........................................ 166/280.1
See application file for complete search history.

(56) References Cited

U.S. PATENT DOCUMENTS

| | | | |
|---|---|---|---|
| 3,007,523 A | 11/1961 | Vincent | |
| 3,368,623 A | 2/1968 | Carter et al. | |
| 6,632,527 B1 * | 10/2003 | McDaniel et al. | ............ 428/402 |
| 6,877,560 B2 * | 4/2005 | Nguyen | ................. C09K 8/685 166/276 |
| 7,297,662 B2 * | 11/2007 | Verret | ........................... 507/107 |
| 7,459,209 B2 * | 12/2008 | Smith et al. | ................... 428/403 |
| 8,567,494 B2 * | 10/2013 | Rytlewski et al. | ........ 166/250.01 |
| 2007/0209795 A1 | 9/2007 | Gupta | |

(Continued)

FOREIGN PATENT DOCUMENTS

| | | | | |
|---|---|---|---|---|
| EP | 1331357 A1 * | 7/2003 | ............. | E21B 43/08 |
| GB | 2435891 A | 9/2007 | | |
| WO | WO 2007/035707 A2 | 3/2007 | | |

OTHER PUBLICATIONS

International Search Report corresponding to PCT/EP2011/063723 dated Oct. 27, 2011 (4 pages).

*Primary Examiner* — Angela M DiTrani
*Assistant Examiner* — Ashish Varma
(74) *Attorney, Agent, or Firm* — Leydig, Voit & Mayer, Ltd.

(57) ABSTRACT

A fracturing material for supporting a bore hole, the fracturing material comprising a hardenable support material, and fibers embedded in the support material.

13 Claims, 4 Drawing Sheets

(56) References Cited

U.S. PATENT DOCUMENTS

2008/0196628 A1 8/2008 Santra et al.
2009/0044942 A1* 2/2009 Gupta .................... C08B 1/003
166/280.2

* cited by examiner

PERMEABLE FRACTURING MATERIAL

FIELD OF THE INVENTION

The invention relates to a fracturing material, a bore hole arrangement, a method of supporting a bore hole, and a method of use.

BACKGROUND OF THE INVENTION

US 2007/0209795 discloses that lightweight polyamide particulates may be used in treatment of subterranean formations, including hydraulic fracturing and sand control methods, such as gravel packing. The polyamide particulates typically have an apparent specific gravity (ASG) between from about 1.05 to about 2.0 and are stable at temperatures up to 500° C. The polyamide particulates may be used in combination with a filler which further serves to increase the strength and temperature stability of the resulting composite. Fracture conductivity may be increased by the placement of the low density polyamide particulates as a partial monolayer.

US 2008/0196628 discloses a method which includes placing a cement composition in a subterranean formation, wherein the cement composition includes cement, rock-forming mineral materials, and water, and permitting the cement composition to set therein. A disclosed composition includes cement, rock-forming mineral materials and water.

WO 2007/035707 discloses a well cement composition for plugging a bore at the location for initiating sidetracking to bore a lateral well is formulated as a slurry of hydraulic cement that contains at least two, but preferably all three of the following additives: (1) a source of silicon dioxide, (2) fracturing proppants and (3) an expansion compound selected from the group consisting of 1%-5% crystalline silica and 60%-99% MgO or CaO, and their mixtures.

U.S. Pat. No. 3,007,523 discloses a system for treating wells in which a formation fracturing process is carried out.

Hydraulic fracturing is a process that results in the creation of fractures in rocks. An important industrial use of hydraulic fracturing is stimulating oil and gas wells. The fracturing is done from a bore hole (wellbore) drilled into reservoir rock formations to enhance oil and natural gas recovery. Hydraulic fractures may be natural or man-made and are extended by internal fluid pressure which opens the fracture and causes it to grow into the rock. Man-made fluid-driven fractures are formed at depth in a bore hole and extend into targeted rock formations. The fracture width is typically maintained after the injection by introducing a fracturing material (proppant) into the injected fluid. Fracturing materials prevents the fractures from closing when the injection is stopped. The technique of hydraulic fracturing is used to increase or restore the rate at which fluids, such as oil, gas or water, can be produced from a reservoir, including reservoirs such as shale rock or coal beds.

Hydraulic fracturing enables the production of natural gas and oil from rock formations deep below the earth's surface. At such depth, there may not be sufficient permeability to allow natural gas and oil to flow from the rock into the well bore and be recovered. For example, creating conductive fractures in the rock is essential to produce gas from reservoirs with extremely low permeability (e.g. shale reservoirs). The fracture provides a conductive path connecting a larger area of the reservoir to the well, thereby increasing the area from which natural gas and liquids can be recovered from the targeted formation.

Conventionally used fracturing fluid is formed of suspended particles in a carrier fluid and is used to hold fractures open after a hydraulic fracturing treatment, thus producing a conductive pathway that fluids can properly flow along. Naturally occurring grain minerals or man-made material (e.g. ceramics) are common proppants used.

However, conventional fracturing material is only of limited value in formations in which an exploitation fluid (such as oil or gas) is included only in small gaps or small quantity within the formation.

OBJECT AND SUMMARY OF THE INVENTION

It is an object of the invention to provide a fracturing material which can also be used in formations in which an exploitation fluid is included only in small gaps or small quantity within the formation.

In order to achieve the object defined above, a fracturing material, a bore hole arrangement, a method of supporting a bore hole, and a method of use according to the independent claims are provided.

According to an exemplary embodiment of the invention, a fracturing material for supporting a bore hole is provided, the fracturing material comprising a hardenable support material, and fibers embedded in the support material.

According to another exemplary embodiment, a bore hole arrangement is provided which comprises a formation having a bore hole formed therein, and fracturing material having the above mentioned features and at least partially filling the bore hole (particularly at least partially filling at least one fracture of the bore hole).

According to a further exemplary embodiment, a method of supporting a bore hole is provided, wherein the method comprises filling at least a part of the bore hole (particularly at least a part of at least one fracture of the bore hole) with a fracturing material which comprises a viscous hardenable support material and fibers embedded in the support material, and hardening the hardenable support material to thereby obtain a solid support matrix with permeable channels formed by the fibers (for instance due to a permeability of the fiber material itself and/or due to gaps between the solidified support matrix and the fibers) embedded in the hardened support material.

According to yet another embodiment, a hardenable or hardened support material and fibers embedded in the support material are used as a fracturing material for hydraulic fracturing.

The term "fracturing material" may particularly denote a proppant material for hydraulic fracturing which is used for holding fractures of a bore hole open, for instance after a hydraulic fracturing treatment.

The term "hardenable support material" may particularly denote a material which can assume a viscous state in which it can flow similarly as a viscous liquid, and which can assume a hardened state in which it is a solid material of high mechanical robustness (such as for instance cement). Hardening of such a material can be achieved by a chemical reaction which can be triggered or promoted, as known by such skilled in the art, for instance by supplying thermal energy or pressure, adding appropriate additives, etc.

The term "fibers" may particularly denote elongated pieces of a given material, roughly round in cross-section, often twisted with other fibers. Fibers may have an aspect ratio which is larger than 2, particularly larger than 5, more particularly larger than 10. The aspect ratio is the ratio between the length of the fiber and a diameter of the fiber. Fibers may form networks by being interconnected or interwoven.

The term "bore hole" or wellbore may particularly denote a vertical, horizontal or slanted hole drilled in a formation such as a rock to access deeper regions of the formation in which exploitation fluids such as oil, gas or water may be located.

The term "fracture" may particularly denote a void in a formation forming an extension of a bore hole. After such a fracture has been formed for instance by applying a hydraulic pressure, it can be prevented from closing again by the use of fracturing material.

According to an exemplary embodiment of the invention, a fracturing material is provided which comprises a mechanically stabilizing component in the form of the hardenable or already hardened support material on the one hand and fibers embedded in the support material on the other hand. By mixing fibers with the hardening material, the resulting fracturing material may fulfill two functions at the same time. On the one hand, the fracturing material may stabilize bore holes, and particularly fractures forming part of bore holes, to provide an actual proppant function. Simultaneously, the fibers within the matrix of the support material may provide the fracturing material with a permeable property, i.e. may form permeable channels allowing to conduct an exploitation fluid such as oil from the formation through the fibers. Thus, fluid communication may be combined with stability of one and the same compound material.

DETAILED DESCRIPTION OF EMBODIMENTS OF THE INVENTION

In the following, further exemplary embodiments of the fracturing material will be explained. However, these embodiments also apply to the bore hole arrangement, the method of supporting a bore hole, and the method of use.

In an embodiment, the support material comprises or consists of cement or synthetic resin. Both these materials can be inserted into fractures in a flowable form, and may be solidified later. Cement can be a powder made of a mixture of calcined limestone and clay, used with water and sand or gravel. A cement is a binder, i.e. a substance which sets and hardens independently, and can bind other materials together. Both hydraulic and non-hydraulic cements may be used according to exemplary embodiments. However, alternatively to a cement, also other hardenable support material such as a synthetic resin, for instance an epoxy resin. Any material may be used which allows to form permeable channels when being mixed with fibers.

In an embodiment, the fibers comprise or consist of synthetic fibers (particularly polytetrafluorethylene (Teflon) fibers) and/or natural fibers. Synthetic fibers are man-made, whereas natural fibers are fibers which are found in nature. Teflon fibers have turned out to be particularly advantageous, since when being mixed with a hardenable support material such as cement, these Teflon fibers are capable to form a channel network allowing for a high degree of permeability. Synthetic fibers may be created by forcing, for instance through extrusion, fiber forming materials through holes into the air, forming a thread. Nylon, polyester, acrylic, and polyolefin are examples for synthetic fibers. Natural fibers may come from plants or animals. An example for such natural fibers are cellulose fibers.

In an embodiment, the fibers are provided as an interconnected fiber network. In such an embodiment, the individual fibers are cross-linked to form a bifurcated system of channels through the fracturing material. This may further improve the permeability.

In an embodiment, the fracturing material further comprises a fluidic additive to be evaporated to thereby leave pores in the fracturing material after evaporation. The boiling point of such a fluidic additive may be below, particularly significantly below (for example at least 50 K below) the boiling point of the support material and of the fibers so that the fluidic additive may be selectively removed from the rest of the fracturing material by increasing the temperature. It has turned out to be highly advantageous to add such a fluidic additive to the hardenable material and fibers, because evaporation of the fluidic additive promotes the formation of permeable channels in an interior of the fracturing material, thereby further increasing the ability to conduct liquids through the fracturing material while at the same time maintaining the high mechanical stability.

In an embodiment, the fluidic additive comprises or consists of a low-boiling liquid, particularly an alcohol. The term "low boiling liquid" may particularly denote a liquid which (for instance under standard conditions such as 1 bar and 20° C.) has a relatively low boiling point, particularly below 80° C., more particularly below 70° C., even more particularly below 60° C. However, the boiling point should be above room temperature, i.e. above 20° C. to prevent unintentional evaporation under normal conditions. Suitable alcohols which can be used for this purpose are methanol, ethanol, propanol, etc. An advantage of the use of a low boiling liquid as an additive to the fracturing material is that at the high temperatures in an interior of a bore hole (for instance more than 100° C. in a depth of 3000 m) the fluidic additive will evaporate automatically without the need to perform any active action such as the supply of thermal energy. Therefore, by only filling the fracturing material at an appropriate depth into the bore hole, evaporation of the fluidic additive may be triggered. Therefore, the formation of pores in an interior of the fracturing material can be promoted with very small technical expenditure.

The fibers may have a weight percentage in the fracturing material in a range between about 0.1% and about 50%, particularly in a range between about 1% and about 10%. However, the exact weight percentage may depend on the used fiber material, used hardenable material, specific application, depth of the bore hole, optional use of additive fluid, etc.

In the following, further exemplary embodiments of the method of supporting a bore hole will be explained. However, these embodiments also apply to the fracturing material, the bore hole arrangement, and the method of use.

In an embodiment, the fracturing material is filled into the bore hole (particularly to fill one or more fractures thereof) in such a depth that the temperature at this depth hardens the hardenable support material. In this embodiment, the hardening of the support material, i.e. a corresponding chemical reaction, may be triggered automatically by the physical conditions within the bore hole or its fracture(s). In a deep bore hole, for instance below 1000 m, more particularly below 2000 m, the pressure and temperature conditions will automatically force the hardenable support material such as cement to become hardened in a short time. Therefore, the hardening of the fracturing material can be performed automatically without additional technical expenditure.

In an embodiment, the fracturing material comprises a low-boiling fluidic additive which evaporates at the temperature in this depth to thereby leave pores in the fracturing material after evaporation. As already mentioned above, the thermal energy deep in a bore hole can be used for evaporating the low boiling fluidic additive.

In an embodiment, the method may further comprise soaking the fibers with fluidic additive (prior to, during, or after a mixing of the fibers with the hardenable material) so that the fibers swell before hardening the hardenable material and constrict (i.e. unswell or subside) upon evaporating the fluidic additive to thereby leave pores in the fracturing material after evaporation. By swelling, the fibers assume a relatively high volume in the fracturing material. When the hardenable material is hardened and the fluidic additive evaporates, the volume assumed by the fibers is reduced so that microchannels remain between the hardened matrix material and the constricted fibers.

Hardening of the hardenable material, particularly cement, is done by a chemical reaction process. It can be accelerated for instance by externally supplying thermal energy because this speeds up also the chemical reactions hardening the hardenable material. Also the supply of additives (for instance a catalyst) to the fracturing material and/or the adjustment of physical parameters such as pressure may be used for controlling the kinematics of the hardening procedure.

In an embodiment, the method further comprises prior to the filling, forming the bore hole (particularly with at least one fracture) and applying an overpressure (for instance by applying a hydraulic pressure) to the bore hole (and particularly to the at least one fracture), and after the filling and the hardening, removing the applied overpressure. Hence, after having formed the bore hole including fractures, they can be temporarily stabilized by applying a suitable overpressure to the bore hole, as known to those skilled in the art. When the fracturing material has been hardened and has sufficient stability to prevent the bore hole from being closed by surrounding material, the overpressure can be removed (for instance by switching off a hydraulic pump). Exploiting an exploitation fluid such as oil from the formation contacted by the fracturing material can be started making use of the porous character of the fracturing material, since the exploiting fluid may be conducted therethrough.

In an embodiment, the method further comprises collecting fluid to be exploited from the formation in which the bore hole has been formed through permeable sections of the hardened fracturing material and out of the bore hole. It is possible to suck the exploitation fluid from the formation through permeable fracturing material and out of the bore hole. It is also possible that the fluid flows without exerting external forces from the formation through the microchannels out of the bore hole. By taking this measure, it becomes possible to stope exploitation fluid even under harsh conditions such as a small concentration of the exploitation fluids in channels of formation.

In the following, a further exemplary embodiment of the method of use will be explained. However, this embodiment also applies to the fracturing material, the bore hole arrangement, and the method of supporting a bore hole.

The above-described system may be used for oil production, water catchment and geothermic systems. Also gas pumping may be possible. Other applications are possible as well.

BRIEF DESCRIPTION OF THE DRAWINGS

The invention will be described in more detail hereinafter with reference to examples of embodiment but to which the invention is not limited.

DETAILED DESCRIPTION OF THE DRAWINGS

The illustrations in the drawings are schematically. In different drawings similar or identical elements are provided with the same reference signs.

In oil industry, cements have been used conventionally for sealing between bore hole wall and casing run. By taking this measure, the integrity of the bore hole is ensured and the communication between individual layers of different pressure regimes can be prevented. As will be explained below, in contrast to this approach, an exemplary embodiment of the invention intends to achieve the opposite by providing a highly permeable cement.

Poorly permeable formation layers can be stimulated in oil industry by acid treatment or fracturing. The latter is characterized by breaking the formation by applying hydraulic pressure. In a next step, a proppant or fracturing material is inserted into the fracture which prevents that the opened fracture is closed again. However, conventional proppants only have a limited pressure robustness and are expensive. Furthermore, the insertion of conventionally used proppants is technically difficult, particularly in the case of horizontal bore holes.

According to an exemplary embodiment, the permeability of cement is improved by the addition of fibers, thereby providing an improved fracturing material. By inserting a highly permeable cement according to an exemplary embodiment of the invention, conventional proppants can be substituted and the productivity of exploiting bore holes can be significantly improved. In order to improve this productivity of oil or gas exploitation, a fracturing process is performed to break the formation, and a natural or synthetic proppant is inserted in order to keep the fracture face of the bore hole open.

According to an exemplary embodiment of the invention, no proppants in the form of sand, bauxite or ceramic materials are inserted into the bore hole as fracturing material, but in contrast to this a hardenable material such as cement including permeability increasing additives. By the mixture of the hardenable material with fibers, the hardenable material can be made permeable and can be used for increasing the productivity. It has turned out to be technologically simple to pump a mixture of cement and fibers into bore holes. Due to their composition, such fracturing materials are significantly cheaper than conventional proppants. In contrast to conventional proppants using spherical bodies, there is basically no risk that the fracturing material according to an exemplary embodiment of the invention is pressed under high pressure into the matrix of the surrounding formation. Hence, embodiments of the invention have a reliable supporting effect which simultaneously enabling a flow of oil, gas, or the like from the formation through the permeable fracturing material and out of the bore hole. By implementing the system according to exemplary embodiments of the invention, fracturing methods can also be carried out in high density formations. Thus, new kinds of formations can also be exploited, mined or stoped according to exemplary embodiments of the invention.

Figure 1:
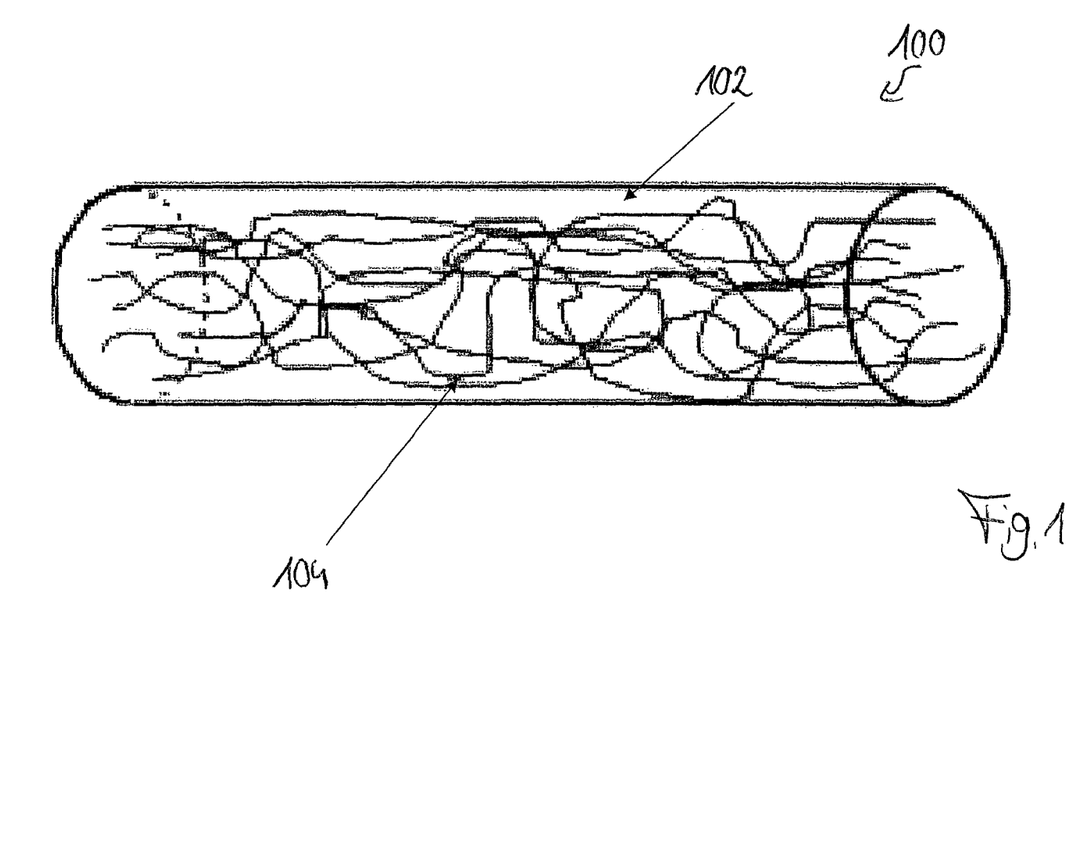
FIG. 1 schematically illustrates fracturing material according to an exemplary embodiment of the invention.

FIG. 1 schematically illustrates a fracturing material 100 for supporting a bore hole according to an exemplary embodiment of the invention.

The fracturing material 100 is a composition of a still deformable, hardenable cement material 102 serving as a matrix for mechanically supporting fractures of a bore hole. Teflon fibers 104 which are cross-linked to form an interconnected network are mixed with the viscous cement 102 to form the fracturing material.

Although not illustrated in FIG. 1, ethanol as a low-boiling additive liquid is added to the fracturing material 100. More precisely, the Teflon fibers 104 are soaked with ethanol before mixing the soaked fibers 104 with the hardenable cement 102. Consequently, the Teflon fibers 104 swell before mixing and increase their volume. Upon hardening of the hardenable cement 102 for instance promoted by the high temperature in a fracture of a bore hole, the ethanol evaporates from the soaked fibers 104 due to its relatively low boiling point as compared to the boiling point of the other components of the fracturing material 100. The fibers 104 will therefore automatically contract (or constrict) upon evaporating of the ethanol to thereby, in view of the reduced fiber volume, leave pores in the hardened fracturing material 100 after evaporation.

Due to these effects, the fracturing material 100 as a whole becomes hardened, wherein the cement 102 then forms a solid support matrix having channels formed therein. These channels are formed at positions at which the low-boiling liquid is removed by evaporation. Furthermore, channel formation is promoted by the interconnected or interwoven fibers 104 itself which may be permeable as well. Therefore, after the hardening, the fracturing material 100 is both robust and permeable for exploitation fluids such as oil or gas.

In the following, referring to FIG. 2A to FIG. 5, a method of supporting a bore hole 200 according to an exemplary embodiment of the invention will be explained. Although not shown in detail, it is possible that any kind of bore equipment such as drill strings, etc. is inserted in the bore hole 200 which is not shown in detail in FIG. 2A to FIG. 5 for sake of simplicity.

Figure 2A:
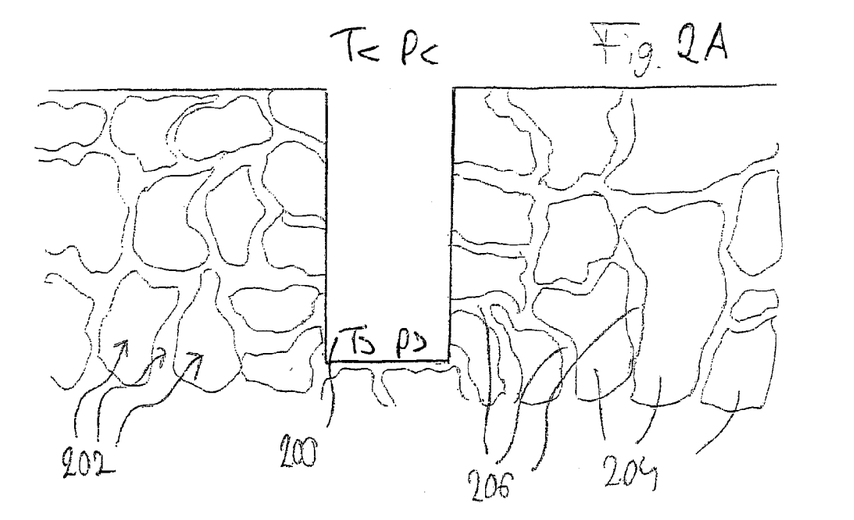
FIG. 2A to FIG. 2C show different operation states during execution of a method of supporting a bore hole according to an exemplary embodiment of the invention in which a bore hole is prepared for the subsequent supply of fracturing material.

FIG. 2A shows a vertical bore hole 200 formed in a formation 202 in a conventional way. The formation 202 is constituted by pieces of rock 204 having gaps 206 in between. These gaps 206 may be filled with an exploitation fluid such as oil or gas. However, it should be emphasized that embodiments of the invention are not limited to the described constitution of the formation 202. Embodiments of the invention may be used in conjunction with many different kinds of formation 202.

As can be taken from FIG. 2A, since the bore hole 200 has a depth of for instance several kilometers, the temperature and the pressure are significantly higher in the deepest position of the bore hole 200 as compared to the surface conditions 200 ($T_>>T_<$, $p_>>p_<$).

Figure 2B:
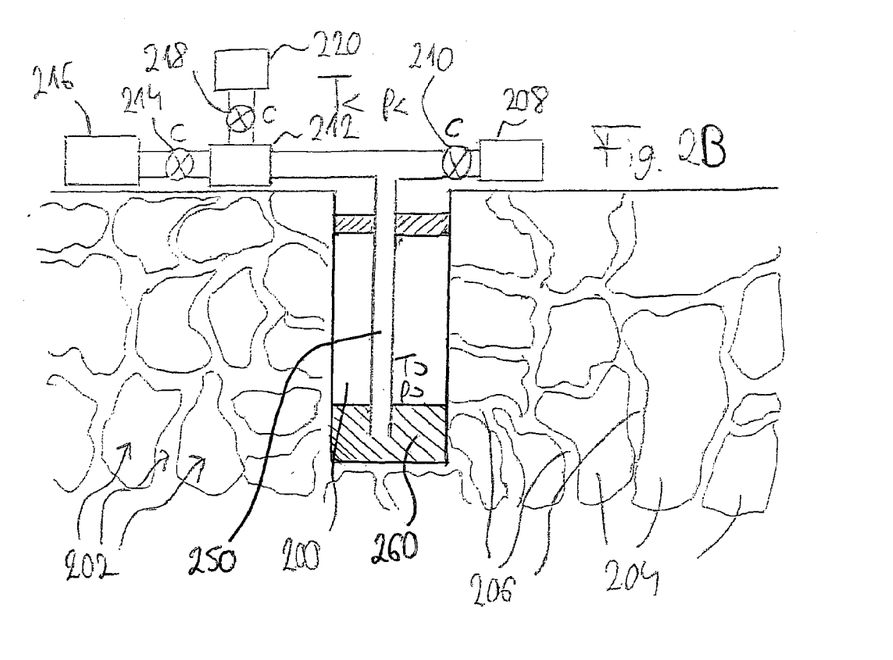

FIG. 2B shows that optionally a tubing 250 and/or other kind of bore equipment may be inserted into the bore hole 200. After the bore hole 200 has been formed, a first pump 208 may be connected to an interior of the bore hole 200 by a first valve 210 to selectively apply an overpressure to the bore hole 200. A second pump 212 can be coupled via a second valve 214 to a fracturing material container 216 and via a third valve 218 with an oil tank 220. Many other configurations of such a pumping system are possible as well. In the operation mode of FIG. 2B, all valves 210, 214, 218 are closed (as indicated by the letter "C", in contrast to a letter "O" indicating an open valve state).

As can be further taken from FIG. 2B, conventional basically non-porous cement 260 may be optionally pumped into a portion of the bore hole 200 to stabilize the formation 202 around the bore hole 200. Although a deepest portion of the bore hole 200 is filled with this cement 260 in the shown embodiment, any other portion of the bore hole 200 may be filled additionally or alternatively with such a cement 260 (for instance, only wall portions of the bore hole 200 may be covered with such a cement 260).

Figure 2C:
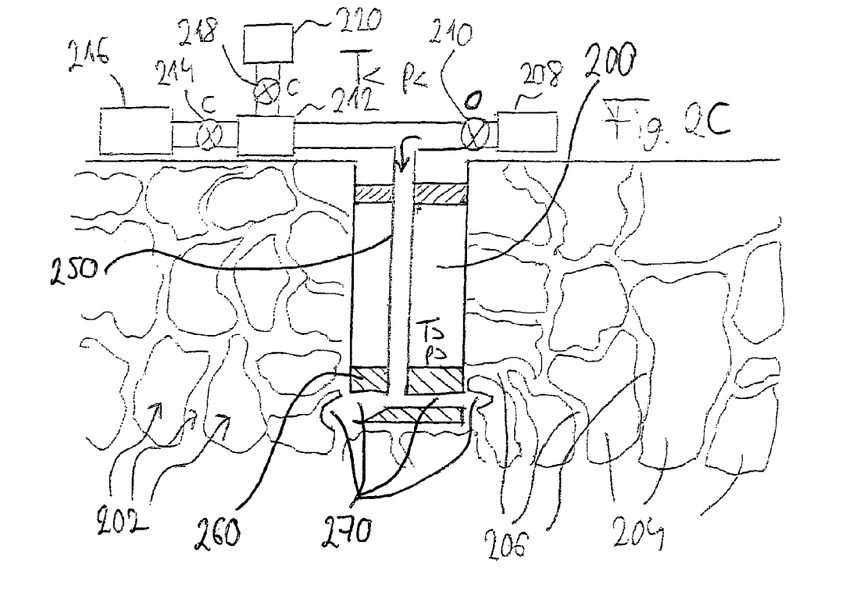

FIG. 2C shows how fractures 270 are formed (for instance hydraulically or by rock blasting) in the cement 260 and in surrounding portions of the formation 202 to spatially extend the bore hole 200 particularly to lateral sides to enable fluid communication with surrounding formation 202. For instance by opening valve 210, it is possible to provide hydraulic pressure to prevent the formation 202 from closing the formed fractures 270.

Figure 3:
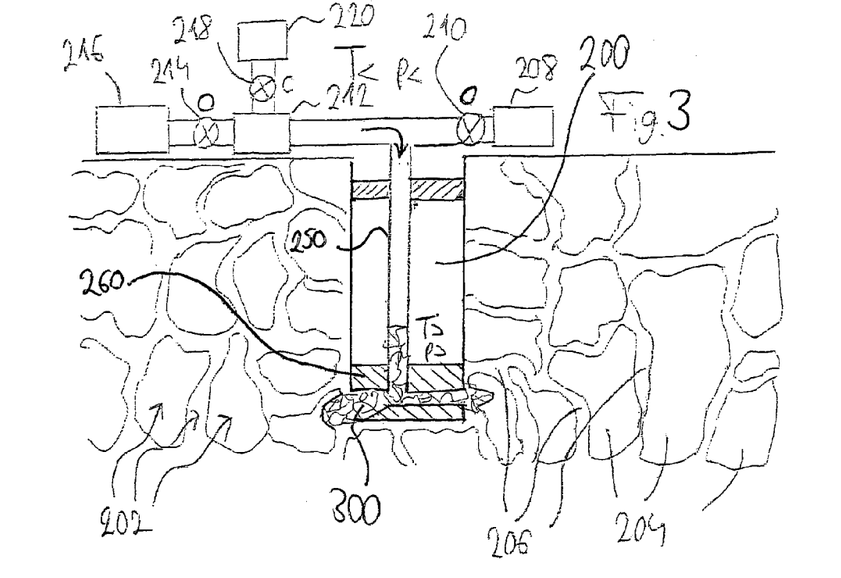
FIG. 3 to FIG. 5 show different operation states during execution of the method of supporting a bore hole and of gaining reservoir fluids according to the exemplary embodiment of the invention of FIG. 2A to FIG. 2B by a supply of fracturing material.

FIG. 3 shows how a portion of the bore hole 202 including its fractures 270 are filled with a suspension constituting a not yet hardened but hardenable fracturing material 300. As can be taken from FIG. 3, the valve 214 can be opened in order to pump the fracturing material 300 from the fracturing material container 216 into the bore hole 200. This will fill at least a part of the bore hole 200 with the still viscous fracturing material 300. The fracturing material 300 comprises cement, Teflon fibers mixed therein, and ethanol as a low boiling liquid additive.

Figure 4:
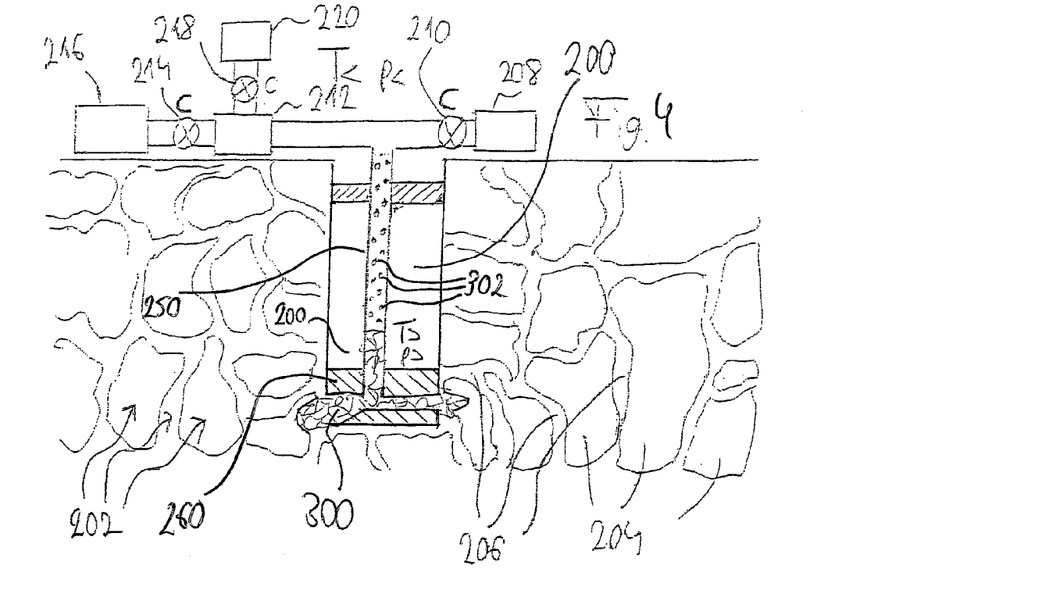

FIG. 4 shows the result of a solidification of the fracturing material 300 which simultaneously forms microchannels in an interior of the fracturing material 300 by evaporating the fluidic additive in and around the fibers and by hardening the cement. The evaporated material is illustrated schematically by reference number 302.

As can be taken from FIG. 4, due to the high pressure and the high temperature in the interior of the deep bore hole 200, the low-boiling additive will evaporate and will leave pores in an interior of the fracturing material 300. Additionally, the high temperature and the high pressure within the bore hole 200 will also promote solidification of the cement of the fracturing material 300. Thus, the solidified fracturing material 300 will give the fractures 270 of the bore hole 200 stability and at the same time will in its interior form an interconnected network of pores or channels, i.e. hollow sections. The valve 214 may be closed now since no further supply of fracturing material 300 is necessary. The valve 210 may be closed now since no further stabilization of the fractures 270 is necessary.

Figure 5:
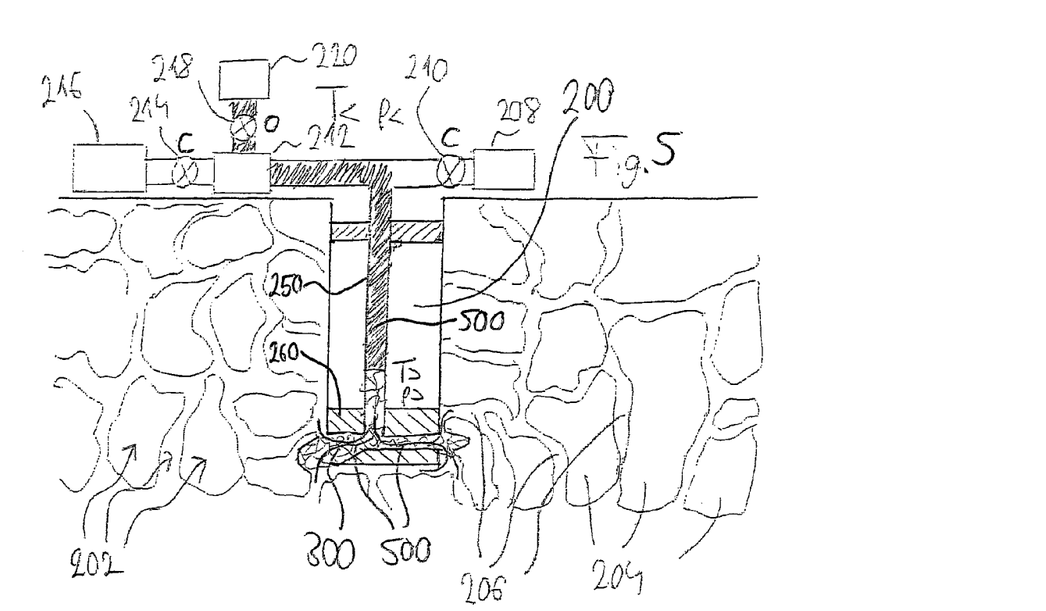

FIG. 5 shows how oil 500 flows from the gaps 206 in the formation 202 through the permeable hardened fracturing material 270 out of bore hole 200. This flow may be due to capillary effects and the like as well as due to the pressure conditions inside and outside of the bore hole 200. It may also be supported by a sucking operation of the pump 212 while valve 218 is open. Consequently, a sucking pressure can be applied by the pump 212 which sucks the oil 500 from the gaps 206 of the formation 202 through the inner channels of the hardened fracturing material 300 and into the oil tank 220.

Hence, the fracturing material 300 fulfils two functions at the same time: Firstly, it has a stabilizing effect on the bore hole 200. Secondly, it may form a permeable solid through which the oil 500 may flow from the gaps 206 to an outside of the bore hole 200.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A fracturing material for supporting a bore hole, the fracturing material comprising:
    a hardenable support material, wherein fibers are embedded in the support material, and
    a fluidic additive to be evaporated by thermal energy in the bore hole to thereby leave pores in the fracturing material after evaporation, so that the fracturing material is fluid permeable,
    wherein the fibers are soaked with the fluidic additive so that the fibers swell before mixing with the hardenable support material and before the hardening of the hardenable material and constrict upon evaporating the fluidic additive to thereby, in view of a reduced fiber volume, leave pores in the fracturing material after evaporation.

2. The fracturing material according to claim 1, wherein the support material comprises or consists of cement or synthetic resin.

3. The fracturing material according to claim 1, wherein the fibers comprise or consist of polytetrafluoroethylene fibers or natural fibers.

4. The fracturing material according to claim 1, wherein the fibers are provided as an interconnected fiber network.

5. The fracturing material according to claim 1, wherein the fluidic additive is water.

6. The fracturing material according to claim 5, wherein the fluidic additive comprises or consists of a low-boiling liquid.

7. The fracturing material according to claim 6, wherein the low-boiling liquid comprises alcohol.

8. The fracturing material according to claim 1, wherein the fibers have a weight percentage in the fracturing material in a range between 0.1% and 50%.

9. The fracturing material according to claim 1, wherein the fracturing material is permeable for oil or gas or water.

10. The fracturing material according to claim 1, wherein the fibers have a weight percentage in the fracturing material in a range between 1% and 10%.

11. A method of supporting a bore hole, the method comprising:
    filling at least a part of at least one fracture of the bore hole with a fracturing material that comprises a viscous hardenable support material and fibers embedded in the support material, wherein the fracturing material is filled into the bore hole at a depth such that the temperature in said depth hardens the hardenable support material, and wherein the fracturing material comprises a low-boiling fluidic additive;
    evaporating the low-boiling fluidic additive using thermal energy in the bore hole to thereby leave pores in the fracturing material after evaporation;
    hardening the hardenable support material to obtain a solid support matrix with permeable channels formed by the fibers embedded in the hardened support material; and
    soaking the fibers with fluidic additive so that the fibers swell before mixing with the hardenable support material and before the hardening of the hardenable material and constrict upon evaporating the fluidic additive to thereby leave pores, in view of a reduced fiber volume, in the fracturing material after evaporation.

12. The method according to claim 11, further comprising:
    prior to the filling, forming the bore hole;
    applying an overpressure to the bore hole; and
    after the filling and the hardening, removing the overpressure.

13. The method according to claim 11, further comprising collecting fluid to be exploited from a formation in which the bore hole has been formed through permeable sections of the hardened fracturing material and out of the bore hole.

* * * * *